US012734486B2

(12) United States Patent
Monji et al.

(10) Patent No.: US 12,734,486 B2
(45) Date of Patent: Sep. 15, 2026

(54) OIL-WATER SEPARATION SYSTEMS AND METHODS OF SEPARATING AQUEOUS EMULSIONS

(71) Applicant: ACULON, INC., San Diego, CA (US)

(72) Inventors: Majid Monji, Poway, CA (US); Eric L. Hanson, Carlsbad, CA (US); Eric L. Bruner, La Jolla, CA (US); Edward Hughes, San Diego, CA (US)

(73) Assignee: ACULON, INC., San Diego, CA (US)

(*) Notice: Subject to any disclaimer, the term of this patent is extended or adjusted under 35 U.S.C. 154(b) by 407 days.

(21) Appl. No.: 18/370,113

(22) Filed: Sep. 19, 2023

(65) Prior Publication Data

US 2024/0091715 A1 Mar. 21, 2024

Related U.S. Application Data

(60) Provisional application No. 63/407,997, filed on Sep. 19, 2022.

(51) Int. Cl.
*B01D 69/02* (2006.01)
*B01D 61/58* (2006.01)
*B01D 71/04* (2006.01)

(52) U.S. Cl.
CPC ............ *B01D 69/02* (2013.01); *B01D 61/58* (2013.01); *B01D 71/04* (2013.01); *B01D 2323/02* (2013.01); *B01D 2323/21839* (2022.08); *B01D 2325/02834* (2022.08); *B01D 2325/36* (2013.01)

(58) Field of Classification Search
CPC ........ B01D 69/02; B01D 61/58; B01D 71/04; B01D 2323/02; B01D 2323/21839; B01D 2325/02834; B01D 2325/36; B01D 67/0088; B01D 69/12; B01D 71/40; B01D 71/401; B01D 71/82; B01D 2325/18
USPC ..... 210/634, 252, 314, 321.75, 321.84, 335, 210/488–490, 504, 506, 500.21
See application file for complete search history.

(56) References Cited

U.S. PATENT DOCUMENTS 9,309,132 B2 * 4/2016 Tarabara ................. E21B 43/34
2002/0153322 A1 * 10/2002 Bruening ............. B01J 20/3242 210/659
2008/0241504 A1 * 10/2008 Bansal .................... B32B 27/00 428/319.3
2019/0070330 A1 * 3/2019 Parrinello .......... B01D 67/0088
2019/0126210 A1 * 5/2019 Qahtan ................ B01D 69/145

* cited by examiner

*Primary Examiner* — Madeline Gonzalez
(74) *Attorney, Agent, or Firm* — Blynn L. Shideler; Krisanne Shideler; BLK Law Group

(57) ABSTRACT

A membrane separation system is provided comprising at least two membranes in series. A first membrane in the series is oleophobic and comprises: (a) a porous substrate; and (b) an oleophobic coating layer applied to at least one surface of the substrate. A second membrane in the series is hydrophilic. The second membrane may comprise a hydrophilic porous substrate, and/or the second membrane further comprises a hydrophilic coating layer applied to at least one surface of the second membrane substrate. Also provided are methods of separating aqueous emulsions, comprising: (i) contacting an aqueous emulsion with the membrane separation system described above; and (ii) allowing water in the emulsion to permeate through the membrane separation system to yield an aqueous product stream.

20 Claims, 5 Drawing Sheets

14
18
16
10
20
12

14
18
16
16
10
20
12
20

14
18
16
10
20
20
12

14
18
16
16
20
10
12

18
14
20
20
10
16
16
12

18
14
20
10
16
12

OIL-WATER SEPARATION SYSTEMS AND METHODS OF SEPARATING AQUEOUS EMULSIONS

FIELD OF THE INVENTION

The present invention relates to membrane separation systems and methods of separating aqueous emulsions.

BACKGROUND OF THE INVENTION

Billions of gallons of waste water are produced annually on petroleum and gas production sites. One of the greatest challenges in oil, gas and energy production and their impact on the environment is the treatment of generated wastewater that contains oil and many smaller, diverse hydrocarbons as contaminants. This treatment is usually done through gravitational settling in large tanks, which requires capital and significant space that is not always available onsite. Gas is separated easily in a mechanical separator or by pressure reduction within storage containers. In the case of heavy oils and many emulsified fluid systems, the raw fluids are often heated to change the density of the oil and water to facilitate separation. Offshore, however, the use of such tanks is simply not feasible. Additionally, the final residual water, often thousands of barrels per day, must be discarded and cannot be released directly into the ocean. Stored water often must be treated by chemicals to reduce interphase surface tensions and induce separation, creating further risk from chemical handling and possible spills.

Industrial membranes which are conventionally used to clean waste streams are usually permeable toward hydrocarbons and repel the aqueous portions. Such membranes are useful for emulsions having oil as the continuous phase rather than water (e.g., "water-in-oil emusions"); otherwise, this system is not economically feasible. For cases where water is the continuous phase (e.g., "oil-in-water emulsions"), a membrane with different properties is needed that is permeable to water and repels the oil.

It would be desirable to provide novel membrane separation systems suitable for use on oil-in-water emulsion fluid streams in particular, that serve to remove contaminants while maintaining fluid flow over an extended period of the service life, and overcoming the drawbacks of the prior art.

SUMMARY OF THE INVENTION

A membrane separation system is provided, comprising at least two membranes in series, wherein a first membrane in the series is oleophobic and comprises: (a) a porous substrate; and (b) an oleophobic coating layer applied to at least one surface of the substrate; and wherein a second membrane in the series is hydrophilic.

Also provided is a surface-treated membrane separation system comprising at least two surface-treated membranes in series. A first surface-treated membrane in the series is oleophobic and comprises: (a) a porous substrate; and (b) an oleophobic coating layer applied to at least one surface of the substrate. A second surface-treated membrane in the series is hydrophilic and comprises: (a') a porous substrate; and (b') a hydrophilic coating layer applied to at least one surface of the substrate.

Also provided are methods of separating aqueous emulsions such as oil-in-water emulsions, comprising: (i) contacting an aqueous emulsion with a membrane separation system as described above; and (ii) allowing water in the emulsion to permeate through the membrane separation system to yield an aqueous product stream.

DETAILED DESCRIPTION OF THE INVENTION

Figures 1, 2:
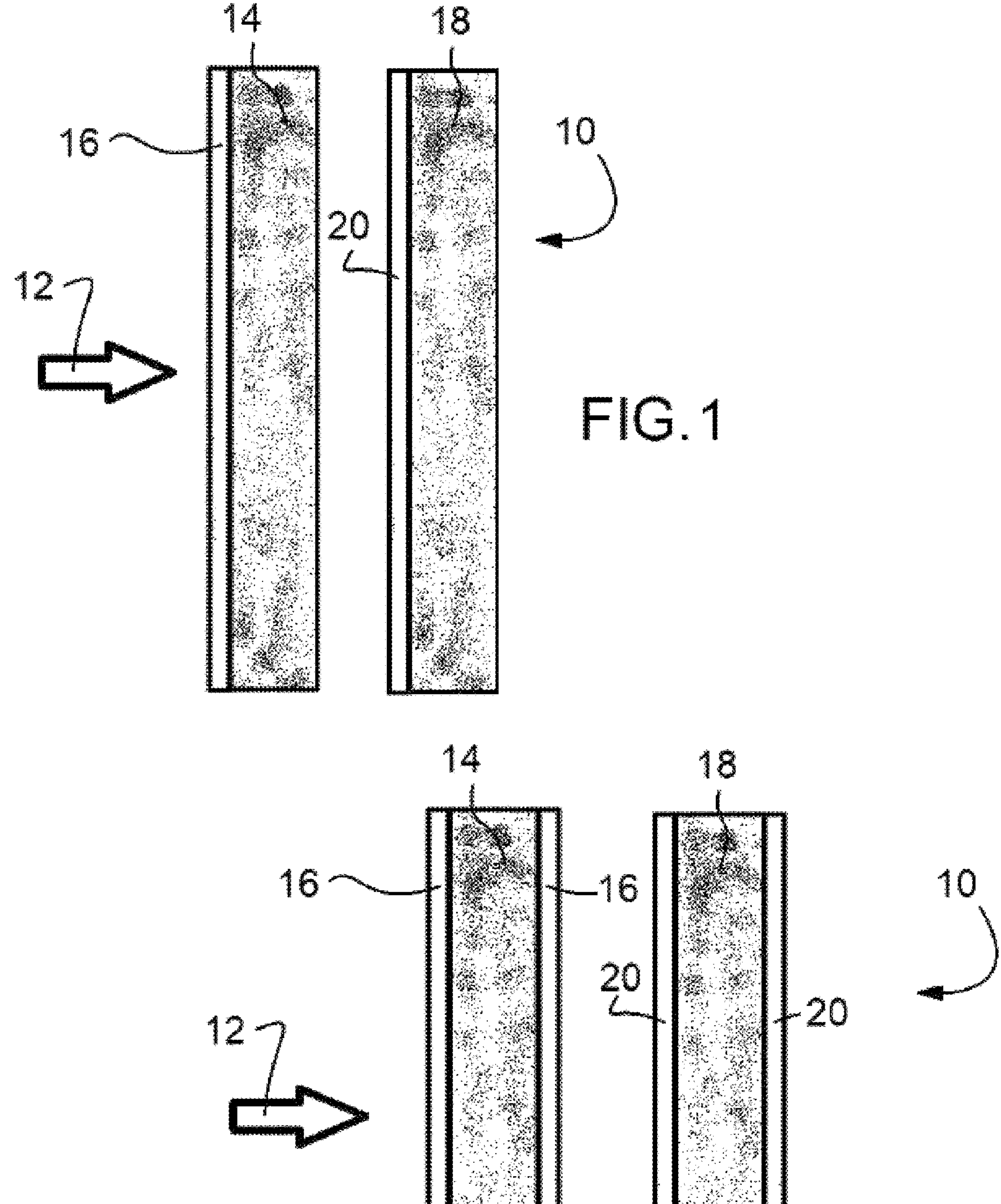
FIG. 1 is a schematic sectional view of an end flow membrane separation system according to one embodiment of the present invention.
FIG. 2 is a schematic sectional view of an end flow membrane separation system according to another embodiment of the present invention.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

As used herein, "formed from" denotes open, e.g., "comprising," claim language. As such, it is intended that a composition "formed from" a list of recited components be a composition comprising at least these recited components, and can further comprise other, non-recited components, during the composition's formation.

An "organic material," as used herein, means carbon-containing compounds wherein the carbon is typically bonded to itself and to hydrogen, and often to other elements as well such as silicon, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., *Hawley's Condensed Chemical Dictionary*, (12th Ed. 1993) at pages 761-762, and M. Silberberg, *Chemistry The Molecular Nature of Matter and Change* (1996) at page 586, which are specifically incorporated by reference herein.

As used herein, the term "inorganic material" means any material that is not an organic material.

As noted above, the present invention is directed to membrane separation systems 10, various embodiments of which are shown in FIGS. 1-9, such as surface-treated membrane separation systems. The systems comprise at least two membranes in series. A first membrane in the series is oleophobic and is typically surface-treated. As such, the first membrane comprises (a) a porous substrate 14, typically in the form of a sheet having opposing surfaces. It may be woven as a mesh, nonwoven, knit, or perforated. The substrate 14 may be inherently porous or may be perforated with ordered or random microarrays of microchannels. "Microchannels" are understood to be micro-dimensional fluidic channels (e.g., having average diameters on a micron or nanometer scale). In microtechnology, a microchannel is understood to have a hydraulic diameter below 1 millimeter. In particular examples of the present invention, the porous substrate (a) 14 demonstrates average pore sizes greater than 100 nm, or even greater than 300 nm. Typically the average pore size of the substrate (a) 14 is less than 1 mm.

The sheet may be flat with a planar or corrugated surface on either or both opposing surfaces, pleated, convex or concave with respect to fluid flow, or in any other configuration known in the filtration art. It may be rigid or flexible. Substrates suitable for use can include a metal such as aluminum (including aluminum oxide), tantalum, stainless steel, or any other substrate commonly used in the preparation of separation membranes, such as polymers having organic or inorganic backbones. Examples of polymers having inorganic backbones include polysiloxanes, polysulfides, polyphosphazenes, and polythiazyls. Examples of polymers having organic backbones include polyester, polyphenylene sulfide (PPS), polyolefins, polyesters and the like. Polyolefins are polymers derived from at least one ethylenically unsaturated monomer. The monomers may contain heteroatoms such as fluorine or chlorine. Suitable examples of monomers include ethylene, propylene, butene, hexene, octene, and/or fluoromonomers such as tetrafluoroethylene. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Examples of polymers used often to prepare the porous substrate 14 may include polyethylene, polypropylene, polybutene, and PTFE. High density and/or ultrahigh molecular weight polyolefins such as high-density polyethylene are also suitable. Copolymers of two or more monomers may also be used.

Non-limiting examples of ultrahigh molecular weight (UHMW) polyolefin can include essentially linear UHMW polyethylene or polypropylene. In as much as UHMW polyolefins are not thermoset polymers having an infinite molecular weight, they are technically classified as thermoplastic materials. As used herein, a "thermoplastic" material is a material that softens when exposed to heat and returns to its original condition when cooled to room temperature. As used herein, a "thermoset" material is a material that solidifies or "sets" irreversibly when heated, usually due to a chemical reaction that takes place during heating.

The ultrahigh molecular weight polypropylene can comprise essentially linear ultrahigh molecular weight isotactic polypropylene. Often the degree of isotacticity of such polymer is at least 95 percent, e.g., at least 98 percent.

Lower molecular weight polyethylene (LMWPE) is also suitable as a substrate 14. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE and other exemplary polymers are found in the following Table 1.

TABLE 1

| Type | Abbreviation | Density, g/cm$^3$ |
|---|---|---|
| Low Density Polyethylene | LDPE | 0.910-0.925 |
| Medium Density Polyethylene | MDPE | 0.926-0.940 |
| High Density Polyethylene | HDPE | 0.941-0.965 |
| Polypropylene | PP | 0.95 |
| Polytetrafluoroethylene | PTFE | 2.20 |

Any or all of the polymers listed in Table 1 above may be used as the porous substrate 14.

As noted, combinations of organic polymers may be used as the porous substrate 14. Other thermoplastic polymers may also be present. Non-limiting examples of thermoplastic organic polymers that optionally may be present in the substrate include copolymers of ethylene and propylene, copolymers of ethylene and acrylic acid, and copolymers of ethylene and methacrylic acid. If desired, all or a portion of the carboxyl groups of carboxyl-containing copolymers can be neutralized with sodium, zinc or the like.

The first membrane further comprises (b) an oleophobic coating layer 16 applied to at least one surface of the substrate 14, usually at least the surface oriented toward a fluid influent 12, as shown in FIGS. 1 to 9. The oleophobic coating layer 16 may be additionally (FIGS. 2, 4, 5, and 9) or alternatively be applied to the surface oriented away from a fluid influent 12. Often, the oleophobic coating layer 16 is applied to the entire substrate 14 surface as shown in FIGS. 2, 4, 5, and 9, particularly when the coating layer 16 is applied by immersion.

The oleophobic coating layer (b) 16 usually comprises a fluoropolymer, which may have reactive functional groups, particularly when the coating is curable. By "oleophobic" is meant having an oil rating of at least 5 A when subjected to AATCC Test Method 118-1997, and/or an oil contact angle (via half angle method) of at least 30 degrees. Examples include any perfluoralkyl or perfluoroalkylether, preferably with groups reactive toward organometallics; i.e., that can participate in ligand metathesis, such as silanol functional groups. Suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minnesota under the name FLUORAD; and perfluorinated hydroxyl functional (meth)acrylate resins. The fluoropolymer may, for example, be prepared by polymerizing one or more fluorinated ethylenically unsaturated monomers such as a fluoroethylene or fluoropropylene and fluoro-functional ethylenically unsaturated ester monomers such as fluoro-functional (meth)acrylate monomers and 2-Methyl-2-propenoic acid tridecafluorooctyl ester, with or without non-fluoro-functional ethylenically unsaturated monomers, using conventional polymerization techniques. Other polymers that are suitable for use as the fluorinated polymer include copolymers, such as terpolymers, of vinylidene fluoride, hexafluoropropylene, tetrafluoroethylene and/or perfluoromethylvinyl ether. Examples of such polymers are VITON A-100 and VITON GF-2005, fluoroelastomers commercially available from The Chemours Company. Each of the fluorinated polymers described above may be used individually or in combination with each other. Fluorinated solvents include EnSolv NEXT solvents, available from Envirotech International. Inc.; VERTREL solvents available from E. I. DuPont de Nemours; and FLUORINERT, NOVEC, and HFE-7500 fluorosolvents, all available from 3M.

Commercially available compositions for use in forming the oleophobic coating layer (b) 16 include several available from Aculon, Inc., such as NANOPROOF 5.0, and NANOPROOF 12.x, XT1, and F550. In certain examples of the present invention, the oleophobic coating layer (b) 16 is essentially free of perfluorooctanoic acid. By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition.

The oleophobic coating layer (b) 16 may be applied to the substrate 14 by conventional means such as dipping, rolling, spraying, wiping to form a film, or by curtain coating. The dry film thickness of the oleophobic coating layer 16 is typically 1 to 100 nm, such as 1 to 20 nm.

Figures 3, 4:
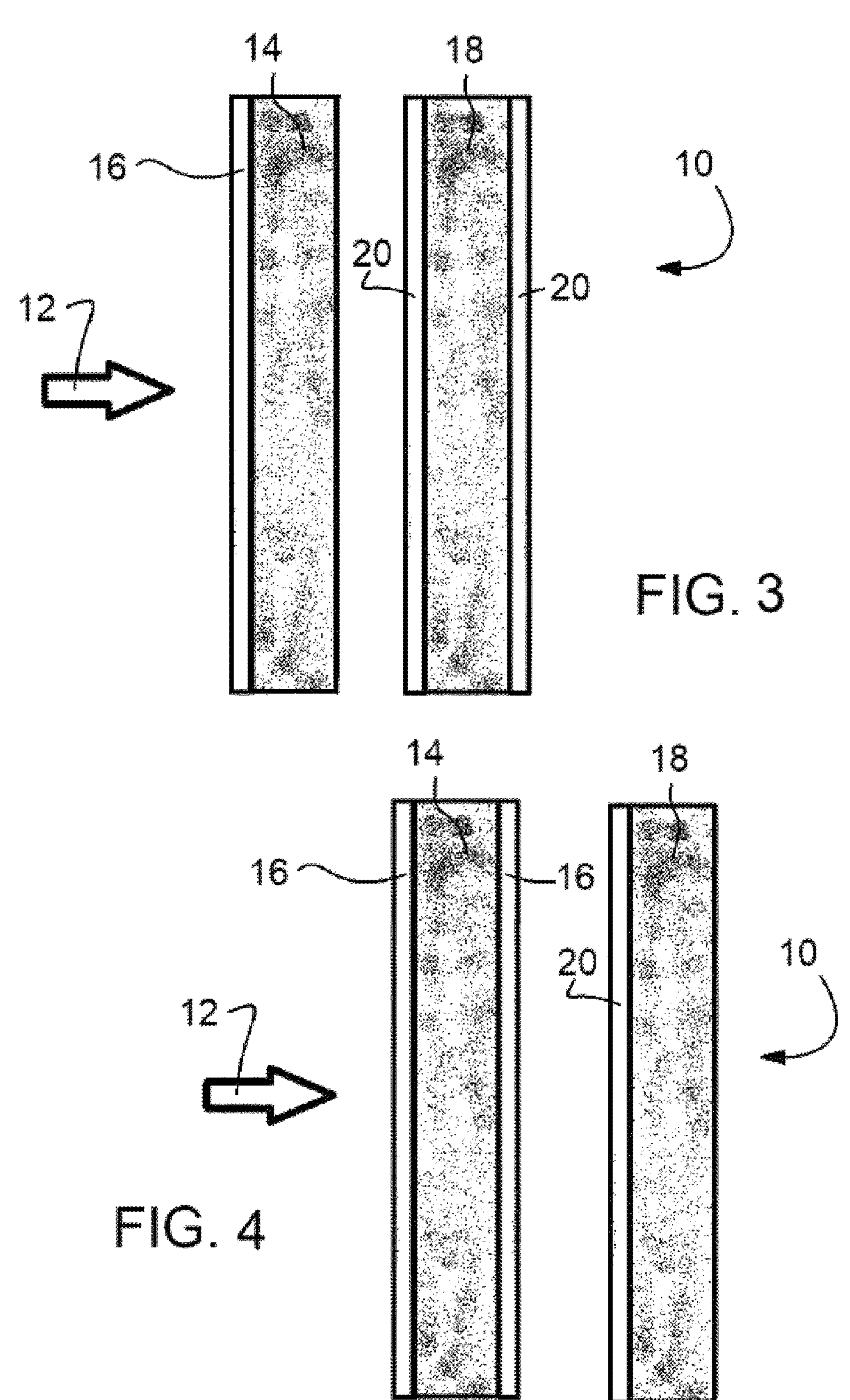
FIG. 3 is a schematic sectional view of an end flow membrane separation system according to another embodiment of the present invention.
FIG. 4 is a schematic sectional view of an end flow membrane separation system according to another embodiment of the present invention.
Figures 5, 6:
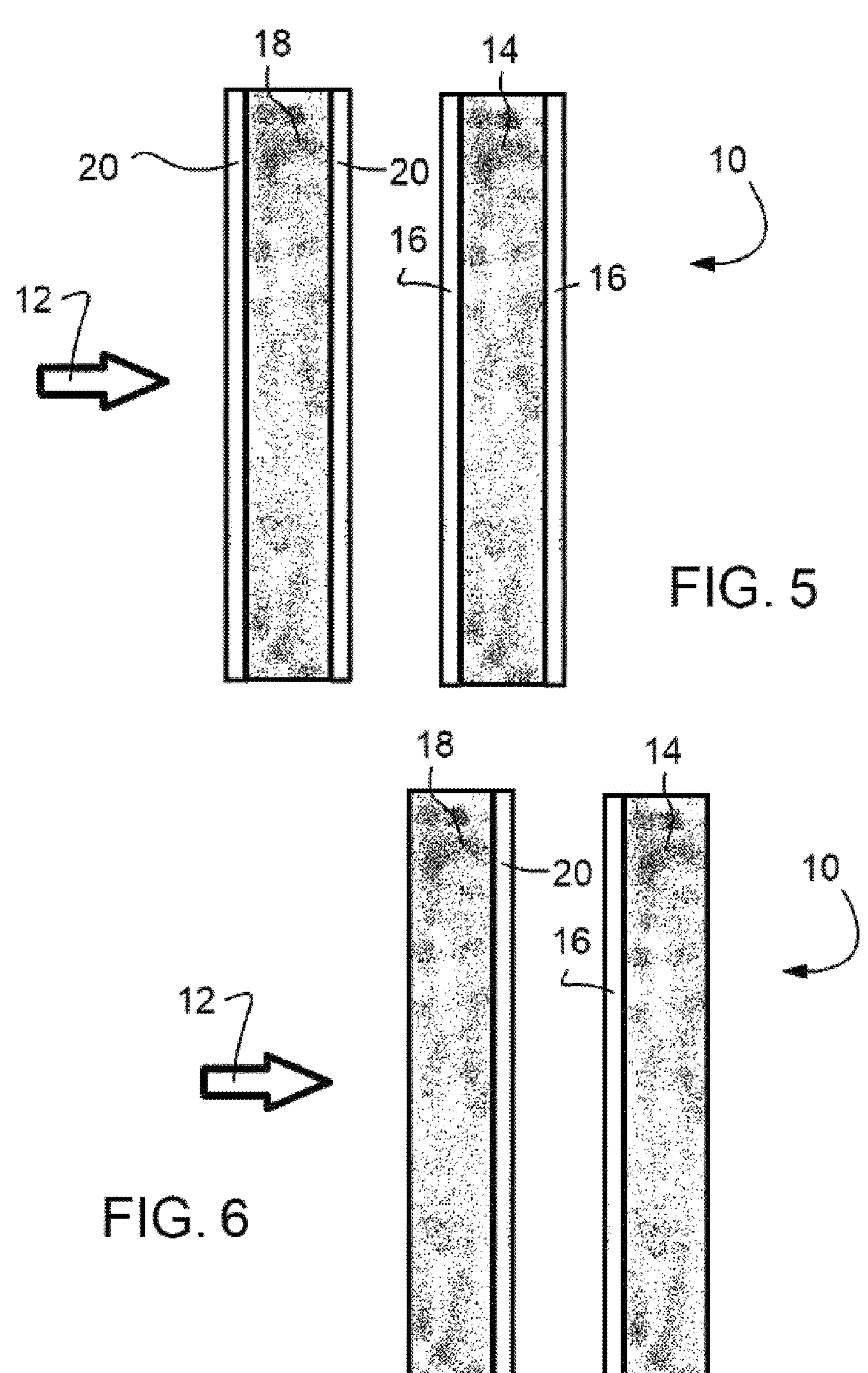
FIG. 5 is a schematic sectional view of an end flow membrane separation system according to another embodiment of the present invention.
FIG. 6 is a schematic sectional view of an end flow membrane separation system according to another embodiment of the present invention.
Figure 8:
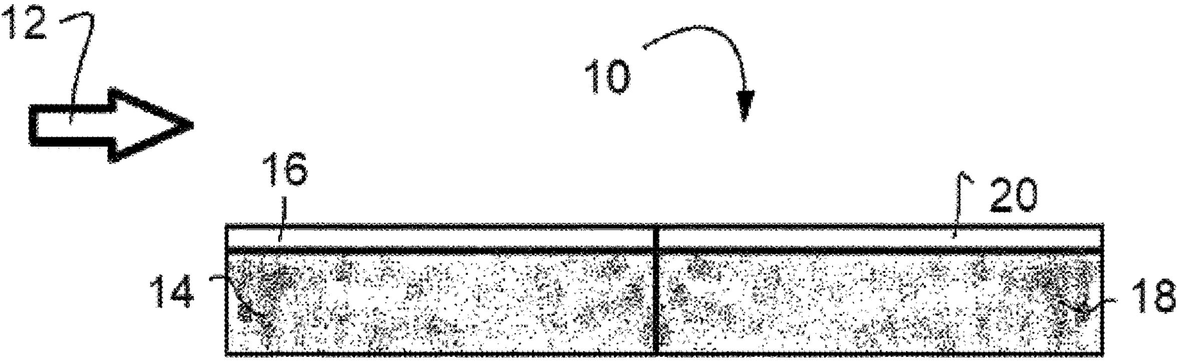
FIG. 8 is a schematic sectional view of a cross flow membrane separation system according to another embodiment of the present invention.
Figure 9:
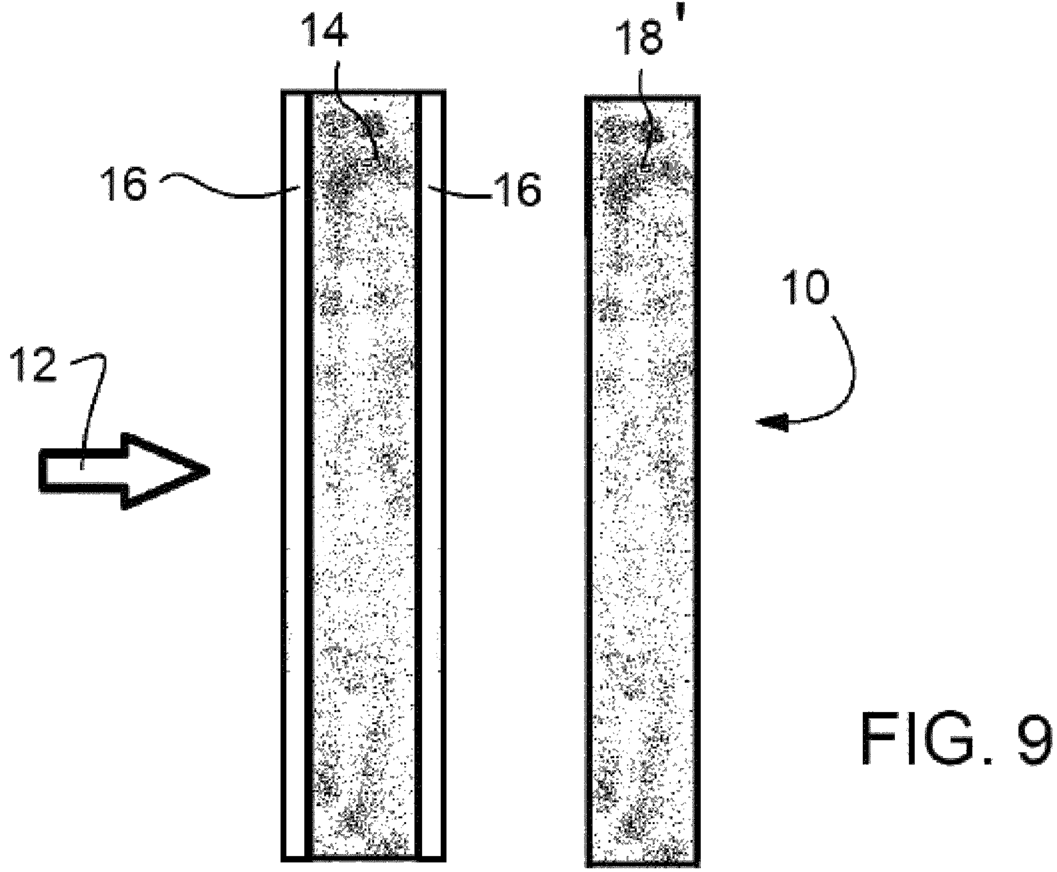
FIG. 9 is a schematic sectional view of an end flow membrane separation system according to another embodiment of the present invention.

A second membrane in series with the first membrane in the separation system is hydrophilic. The second membrane may comprise (a') a porous substrate 18 that may be any of those disclosed above, and may be the same as or different from the porous substrate 16 used to form the first membrane. In certain examples, the second membrane may comprise an inherently hydrophilic substrate 18', as shown in FIG. 9, such as a glass fiber substrate. An inherently hydrophilic substrate 18' would not require a hydrophilic coating layer applied thereto (such an embodiment is shown in the FIG. 9); however, the second membrane may further comprise (b') a hydrophilic coating layer 20 applied to at least one surface of the substrate 18 or 18' to form a second surface-treated membrane. Again, usually at least the surface oriented toward a fluid influent 12 is coated (FIGS. 1 to 5 and 8). By "hydrophilic" is meant demonstrating an attraction to water, such that on articles coated with the hydrophilic coating, the contact angle of water is often less than 60 degrees, or less than 40 degrees, or less than 25 degrees, and the coating layer usually demonstrates a surface energy greater than 40 $mJ/m^2$. Often, the hydrophilic coating layer 20 is applied to the entire substrate 18 surface (as shown in FIGS. 2, 3, and 5), particularly when the coating layer 20 is applied by immersion, but it may be applied using any of the methods discussed above.

The hydrophilic coating layer (b') 20 usually comprises compounds that do not readily dissolve in water. For example, a monolayer system that is hydrolytically stable is suitable. An organometallic treatment composition deposited on the substrate 18, followed by hydrophilic siloxane or phosphonic acid, is often used. Alternatively, a nonreactive metal/oxide such as titanium or tantalum metal is suitable. Hydrophilic polymer layers may be deposited on the mesh and if necessary, crosslinked to provide stability. An exemplary hydrophilic coating layer 20 may be formed from a solution of hydrophilic poly(methacrylamide) containing ionic functionality. Preferably, hydrophilic films will contain compounds with functional groups that are capable of undergoing extensive hydrogen bonding with water, such as ionic or ionizable functional groups, zwitterionic groups, amines or amine salts, sulfonates, carboxylates, glycols, and the like. The dry film thickness of the hydrophilic coating layer is typically 1 to 500 nm, such as 1 to 400 nm, or 1 to 300 nm, or 100 to 500 nm, or 200 to 500 nm, or 300 to 500 nm.

In certain examples, the hydrophilic coating layer (b') 20 comprises a fluorine-containing nonionic surfactant and an amphoteric, fluorine-containing betaine surfactant. Commercially available fluorine-containing nonionic surfactants include CAPSTONE FS-3100. Commercially available amphoteric, fluorine-containing betaine surfactants include CAPSTONE FS-50. Both are available from The Chemours Company.

Adjuvant materials may be present in any of the above film-forming compositions. Examples include solvents, viscosity (rheology) modifying components such as shear thinning or thixotropic compounds, stabilizers such as sterically hindered alcohols and acids, surfactants and anti-static agents. Exemplary organic solvents include alcohols such as methanol, ethanol and propanol, aliphatic hydrocarbons such as hexane, isooctane and decane; ethers, for example, tetrahydrofuran, and dialkylethers such as diethylether. Fluorinated solvents include EnSolv NEXT solvents, available from Envirotech International. Inc.; VERTREL solvents available from E. I. DuPont de Nemours; and FLUORINERT, NOVEC, and HFE-7500 fluorosolvents, all available from 3M.

The adjuvants, if present, are individually present in each of the compositions in amounts of up to 99 percent by weight (usually primarily solvent), or up to 95 percent by weight, or up to 75 percent by weight, based on the non-volatile (solids) content of the composition.

Examples of commercially available coating compositions suitable for use as the hydrophilic coating layer (b') 20 include ON 470 and CA12, both available from Aculon, Inc.

The compositions used to form each coating layer 16 and 20 can be prepared by mixing all of the components at the same time with low shear mixing or by combining the ingredients in several steps.

After application of each coating layer, any solvent in the coating composition is permitted to evaporate and curing of any reactive functional groups may occur. This can be accomplished by heating to 50 to 200° C., often 60 to 85° C., or by simple exposure to ambient temperature, which is usually from 20 to 25° C.

The term "cure", "cured" or similar terms, as used in connection with a cured or curable composition, e.g., a "cured composition" of some specific description, means that at least a portion of any polymerizable and/or cross-linkable components that form the curable composition is polymerized and/or crosslinked. Additionally, curing of a composition refers to subjecting said composition to curing conditions such as heating or exposure to actinic radiation, depending on the chemistry, leading to the reaction of any reactive functional groups in the composition. The term "at least partially cured" means subjecting the composition to curing conditions, wherein reaction of at least a portion of the reactive groups of the composition occurs. The composition can be subjected to curing conditions as necessary depending on the composition of the coating layers, such that a substantially complete cure is attained and wherein further curing results in no significant further improvement in physical properties, such as hardness. The coating layers formed by the surface treatment compositions do not detrimentally block the pores of the membranes.

Figure 7:
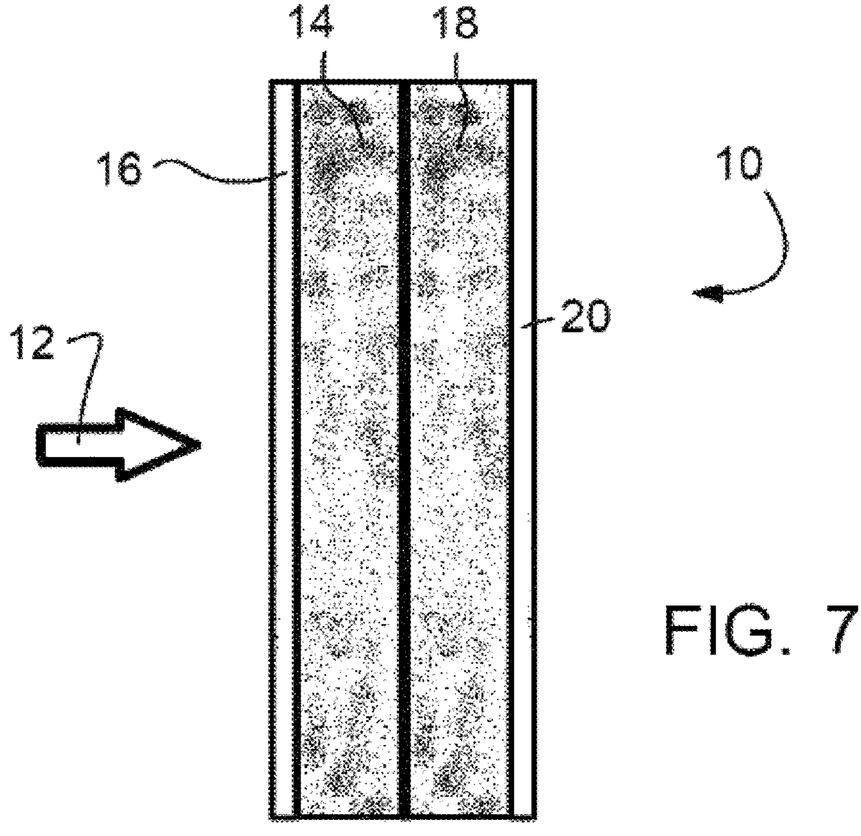
FIG. 7 is a schematic sectional view of an end flow membrane separation system according to another embodiment of the present invention.

The membranes may be housed in filter assemblies. Any suitable filter assembly known in the art may be used, with the membranes described above used as the separation media. The membrane housed within the filter assembly may be in any practical configuration; for example, it may be configured to maximize surface area contact with the fluid being treated, such as by pleating. The first and second membranes are typically situated immediately adjacent each other in the membrane separation system, in contact with each other, as shown in FIGS. 7 and 8. Alternatively, the first and second membranes may be situated in the membrane separation system with a gap between them, as shown in FIGS. 1-6 and 9.

In addition, the membrane separation system may further comprise additional oleophobic and/or hydrophilic membranes. Typically, the membranes are arranged in an alternating configuration. The system may also include a conventional filter to remove solid particulates from a fluid feed stream before contacting the surface-treated membranes.

The present invention is further drawn to a method of separating an aqueous emulsion. By "aqueous emulsion" is meant an emulsion having a continuous aqueous phase, with a dispersed liquid phase comprising compounds that are immiscible with water, such as organic compounds including, inter alia, oil and other hydrocarbons, polysiloxanes, and the like. The method comprises:

(i) contacting the emulsion with a membrane separation system, such as a surface-treated membrane separation system, comprising at least two membranes in series; and (ii) allowing water in the emulsion to permeate through the membrane separation system to yield an aqueous product stream. The membrane separation system may be any of those disclosed above.

In step (i) of the method of the present invention, the emulsion is contacted with the membrane system, typically by passing the stream 12 through the membranes. This is known as an end-flow configuration, and is shown in FIGS. 1-7 and 9. Alternatively, the stream may flow parallel to the membranes in a cross-flow configuration, as shown in FIG. 8. Pumping or gravity feed may be employed. In step (ii), water permeates through the membrane separation system 10 to yield an aqueous product stream.

The first membrane, i.e., the oleophobic membrane comprising substrate 14 and coating layer 16, may be situated upstream of the second (hydrophilic) membrane, such that the emulsion 12 contacts the oleophobic membrane first. Such a configuration is schematically shown in FIGS. 1 to 4 and 7 to 9. Alternatively, the first (oleophobic) membrane may be downstream of the second membrane, and the emulsion 12 contacts the second membrane first, as shown in FIGS. 5 and 6.

Exemplary aqueous emulsion waste streams 12 that may be treated include industrial wastewaters, oil well effluents such as wastewater streams from oil production including oil and gas drilling muds, oil production brines, municipal sewage, pharmaceutical production process water, poultry processing plant effluents, and the like. Oil-in-water emulsions that may be treated by the method of the present invention include emulsions that usually comprise 0.5 to 10 percent by weight hydrocarbon, based on the total weight of the emulsion. Examples of other contaminants that may be present in the waste stream to be treated include animal fats; proteins; toxins; heavy metals; dyes; lubricants; and/or pesticides.

An organic compound-rich, such as a hydrocarbon-rich retentate is formed within the system and may be recirculated to the feed stream 12. The retentate may further comprise other organic materials that are repelled by the membranes in the separation system. The aqueous product stream typically comprises less than 3 percent by weight hydrocarbon, based on the total weight of the aqueous product stream.

FIG. 1 is a schematic sectional view of an end flow membrane separation system 10 according to one embodiment of the present invention, comprising a first substrate 14 and a second substrate 18 each with a single coating layer 16 and 20, respectively, as discussed above. The substrates 14 and 18 are in series and may be spaced with a gap between or situated directly in contact with one another as shown in FIG. 7. The coating layers 16 and 20 may face upstream as shown, or downstream of the stream 12, or alternating as shown in FIG. 7.

FIG. 2 is a schematic sectional view of an end flow membrane separation system 10 according to another embodiment of the present invention, comprising a first substrate 14 and a second substrate 18 each with a dual-sided coating layer 16 and 20, respectively, as discussed above. The substrates 14 and 18 are in series and may be spaced as shown or stacked directly upon one another.

FIG. 3 is a schematic sectional view of an end flow membrane separation system 10 according to another embodiment of the present invention, comprising a first substrate 14 and a second substrate 18, In this embodiment the first substrate 14 has a single coating layer 16 and the second substrate 18 is coated on both opposing sides with coating layer 20. The substrates 14 and 18 are in series and may be spaced as shown or directly in contact with one another. The single coating layer 16 may face upstream as shown, or downstream of the stream 12.

FIG. 4 is a schematic sectional view of an end flow membrane separation system 10 according to another embodiment of the present invention comprising a first substrate 14 and a second substrate 18, In this embodiment the second substrate 18 has a single coating layer 20 and the first substrate 14 is coated on both opposing sides with coating layer 16. The substrates 14 and 18 are in series and may be spaced as shown or directly in contact with one another. The single coating layer 20 may face upstream as shown, or downstream of the stream 12.

FIG. 5 is a schematic sectional view of an end flow membrane separation system 10 according to another embodiment of the present invention comprising a first substrate 14 and a second substrate 18 each with a dual-sided coating layer 16 and 20, respectively, similar to FIG. 2 discussed above. The substrates 14 and 18 are in series and may be spaced as shown or stacked directly upon one another. This embodiment illustrates the hydrophilic membrane comprising hydrophilic coating layer 20 and substrate 18 positioned upstream of the oleophobic membrane comprising substrate 14 and coating layer 16.

FIG. 6 is a schematic sectional view of an end flow membrane separation system 10 according to another embodiment of the present invention similar to FIG. 1 in that the substrates have a single surface coating 16 or 20, and similar to FIG. 5 in that the hydrophilic membrane comprising hydrophilic coating 20 and substrate 18 are positioned upstream of the oleophobic membrane comprising substrate 14 and coating 16.

FIG. 8 is a schematic sectional view of a cross flow membrane separation system 10 according to another embodiment of the present invention comprising a first substrate 14 and a second substrate 18 in series, each with a single coating layer 16 and 20 facing the stream 12.

FIG. 9 is a schematic sectional view of an end flow membrane separation system 10 according to another embodiment of the present invention comprising a first substrate 14 with a single coating layer 16, as discussed above. The second substrate 18' is hydrophilic. The substrates 14 and 18' are in series and may be spaced as shown or directly in contact with one another. The coating layer 16 may face upstream as shown, or downstream of the stream 12.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A membrane separation system for separating an aqueous emulsion, comprising at least two end flow membranes in series, housed in a filter assembly, wherein a first membrane in the series is oleophobic and comprises:

(a) a porous substrate; and (b) an oleophobic coating layer having a thickness of 1 to 20 nm applied to at least one surface of the substrate; and wherein a second membrane in the series is hydrophilic and is spaced from the first membrane by a gap positioned in the direction of flow of the aqueous emulsion, whereby the membrane separation system is configured for separating an aqueous emulsion.

2. The membrane separation system of claim 1, wherein the second membrane comprises a porous substrate, wherein the porous substrate of the second membrane is hydrophilic and/or the second membrane further comprises a hydrophilic coating layer applied to at least one surface of the porous substrate.

3. The membrane separation system of claim 2, wherein the porous substrate in each of the first and second membranes demonstrates average pore sizes greater than 100 nm.

4. The membrane separation system of claim 2, wherein the porous substrate of the second membrane comprises a glass fiber substrate.

5. The membrane separation system of claim 2, wherein the second membrane further comprises the hydrophilic coating layer applied to at least one surface of the porous substrate of the second membrane, and the hydrophilic coating layer comprises poly(methacrylamide) containing ionic functionality and zwitterionic compounds.

6. The membrane separation system of claim 5 wherein the hydrophilic coating layer demonstrates a water contact angle less than 40 degrees.

7. The membrane separation system of claim 1, wherein the porous substrate in each of the first and second membranes independently comprises a metal mesh or a perforated metal sheet.

8. The membrane separation system of claim 1, wherein the oleophobic coating layer comprises a fluoropolymer.

9. The membrane separation system of claim 1, wherein the oleophobic coating layer demonstrates an oil rating of at least 5A when subjected to AATCC Test Method 118-1997, and/or an oil contact angle (via half angle method) of at least 30 degrees.

10. A surface-treated membrane separation system for separating an aqueous emulsion comprising at least two end flow surface-treated membranes in series, housed in a filter assembly, wherein a first surface-treated membrane in the series is oleophobic and comprises:

(a) a porous substrate; and (b) an oleophobic coating layer having a thickness of 1 to 20 nm applied to at least one surface of the substrate; and wherein a second surface-treated membrane in the series is hydrophilic and is spaced from the first membrane by a gap positioned in the direction of flow of the aqueous emulsion whereby the membrane separation system is configured for separating an aqueous emulsion, and wherein the second surface-treated membrane comprises:

(a') a porous substrate; and (b') a hydrophilic coating layer having a thickness of 1-500 nm applied to at least one surface of the substrate.

11. The surface-treated membrane separation system of claim 10, wherein the porous substrate in each of the first and second surface-treated membranes independently comprises a metal mesh or a perforated metal sheet.

12. The surface-treated membrane separation system of claim 10, wherein the porous substrate in each of the first and second surface-treated membranes demonstrates average pore sizes greater than 100 nm.

13. The surface-treated membrane separation system of claim 10, wherein the oleophobic coating layer comprises a fluoropolymer.

14. The surface-treated membrane separation system of claim 10, wherein the hydrophilic coating layer comprises poly(methacrylamide) containing ionic functionality and zwitterionic compounds.

15. The surface-treated membrane separation system of claim 10, wherein the oleophobic coating layer demonstrates an oil rating of at least 5A when subjected to AATCC Test Method 118-1997, and/or an oil contact angle (via half angle method) of at least 30 degrees.

16. The surface-treated membrane separation system of claim 10, wherein the hydrophilic coating layer demonstrates a water contact angle less than 40 degrees.

17. A method of separating an aqueous emulsion, comprising:

(i) contacting the aqueous emulsion with a surface-treated membrane separation system comprising at least two end flow surface-treated membranes in series housed in a filter assembly; and (ii) allowing water in the emulsion to permeate through the membrane separation system to yield an aqueous product stream, wherein a first surface-treated membrane in the series is oleophobic and comprises:

(a) a porous substrate; and (b) an oleophobic coating layer having a thickness of 1 to 20 nm applied to at least one surface of the substrate; and wherein a second surface-treated membrane in the series is hydrophilic and is spaced from the first membrane by a gap positioned in the direction of flow of the aqueous emulsion, and comprises:

(a') a porous substrate; and (b') a hydrophilic coating layer having a thickness of 1-500 nm applied to at least one surface of the substrate.

18. The method of claim 17, wherein either: 1) the first surface-treated membrane is upstream of the second surface-treated membrane, and the aqueous emulsion contacts the first surface-treated membrane first; or 2) the first surface-treated membrane is downstream of the second surface-treated membrane, and the aqueous emulsion contacts the second surface-treated membrane first.

19. The method of claim 17, wherein the aqueous emulsion is an oil-in-water emulsion comprising a wastewater stream from oil production, oil production brine, municipal sewage, pharmaceutical production process water, or poultry processing plant effluent.

20. The method of claim 19, wherein the oil-in-water emulsion comprises 0.5 to 10 percent by weight hydrocarbon, based on the total weight of the oil-in-water emulsion.

* * * * *